United States Patent
Sodagar

(10) Patent No.: US 12,519,844 B2
(45) Date of Patent: Jan. 6, 2026

(54) METHOD AND APPARATUS FOR NETWORK-DRIVEN EDGE CONFIGURATION IN 5G REAL-TIME COMMUNICATION SESSIONS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 8 days.

(21) Appl. No.: 18/631,730

(22) Filed: Apr. 10, 2024

(65) Prior Publication Data

US 2024/0348671 A1  Oct. 17, 2024

Related U.S. Application Data

(60) Provisional application No. 63/458,628, filed on Apr. 11, 2023.

(51) Int. Cl.
*G06F 13/00* (2006.01)
*H04L 65/1108* (2022.01)
*H04L 65/65* (2022.01)
*H04L 65/75* (2022.01)

(52) U.S. Cl.
CPC ......... *H04L 65/1108* (2022.05); *H04L 65/65* (2022.05); *H04L 65/75* (2022.05)

(58) Field of Classification Search
CPC ..... H04L 65/1108; H04L 65/65; H04L 65/75; H04L 65/1069; H04L 65/80
USPC ........................................ 709/227, 224, 223
See application file for complete search history.

(56) References Cited

U.S. PATENT DOCUMENTS

| | | | |
|---|---|---|---|
| 10,491,753 B2* | 11/2019 | Al-Mehdar | H04L 61/5007 |
| 11,811,843 B2* | 11/2023 | Bouazizi | H04L 65/1108 |
| 2019/0306324 A1 | 10/2019 | Al-Mehdar et al. | |
| 2022/0247970 A1 | 8/2022 | Thulasi et al. | |
| 2023/0050360 A1 | 2/2023 | Sodagar | |

(Continued)

FOREIGN PATENT DOCUMENTS

WO  202301 4085 A1  2/2023

OTHER PUBLICATIONS

"3rd Generation Partnership Project; Technical Specification Group Services and System Aspects; 5G Real-time Media Communication Architecture (Stage 2) (Release 18)", 3GPP TS 26.506 V1.1.0 (Feb. 2023), Technical Specification, 29 pages.

(Continued)

*Primary Examiner* — Kenneth R Coulter
(74) *Attorney, Agent, or Firm* — Sughrue Mion, PLLC

(57) ABSTRACT

A method, apparatus, and non-transitory storage medium for network driven management of 5G Real-time Media Communication (5G RTC) for edge processing may be provided. The method may include creating a real-time communication (RTC) provisioning session by a RTC application provider (AP) with a RTC application function (AF) and provisioning one or more RTC features associated with the RTC provisioning session by the RTC AP. The method may also include receiving a notification of a WebRTC session starting over a 5G network, then determining whether the WebRTC session is eligible for requesting edge resources; and starting media streaming over the 5G network.

20 Claims, 6 Drawing Sheets

(56) References Cited

U.S. PATENT DOCUMENTS

2023/0064154 A1 3/2023 Bouazizi et al.
2024/0348497 A1* 10/2024 Sodagar .................. H04L 65/65

OTHER PUBLICATIONS

International Search Report dated Jul. 24, 2024 issued in International Application No. PCT/US24/24067.
Written Opinion dated Jul. 24, 2024 issued in International Application No. PCT/US24/24067.

* cited by examiner

METHOD AND APPARATUS FOR NETWORK-DRIVEN EDGE CONFIGURATION IN 5G REAL-TIME COMMUNICATION SESSIONS

CROSS-REFERENCE TO RELATED APPLICATION

This application claims priority from U.S. Provisional Application No. 63/458,628 filed on Apr. 11, 2023, the disclosure of which are incorporated herein by reference in their entirety.

FIELD

The disclosure generally relates to combining edge server management and setup in 5G networks, specifically, 5G real-time communication (RTC) scenarios.

BACKGROUND

The disclosure generally relates to combining edge server management and setup in 5G networks, specifically, 3GPP TS26.506 defines an architecture for 5G real-time communication session. While the specification is under development, the current draft defines a brief description of the possibility of using the edge servers in the RTC sessions. 3GPP TS26.506 also defines the general notion of setting up the edge servers by network, however it lacks the method of communication or workflow using which edge servers are dedicated for the RTC sessions. Therefore, communication method and workflow using which edge servers are dedicated for the RTC sessions are needed.

SUMMARY

According to one or more embodiments, a method for network driven management of 5G Real-time Media Communication (5G RTC) for edge processing, the method being executed by at least one processor, the method may include creating a real-time communication (RTC) provisioning session among an edge enabled RTC application function (AF) and an edge enabled RTC application provider (AP); provisioning one or more RTC features associated with the RTC provisioning session; subsequent to a WebRTC session starting over a 5G network, determining service access information associated with the WebRTC session; and starting media streaming over the 5G network, in response to, determining that the WebRTC session is eligible to request edge processing resources based on the service access information.

According to an embodiment, an apparatus for network driven management of 5G Real-time Media Communication (5G RTC) for edge processing may be provided. The apparatus may include at least one memory configured to store program code; and at least one processor configured to read the program code and operate as instructed by the program code. The program code may include first creating code configured to cause the at least one processor to create a real-time communication (RTC) provisioning session among an edge enabled RTC application function (AF) and an edge enabled RTC application provider (AP); first provisioning code configured to cause the at least one processor to provision one or more RTC features associated with the RTC provisioning session; first determining code configured to cause the at least one processor to determine, subsequent to a WebRTC session starting over a 5G network, service access information associated with the WebRTC session; and streaming code configured to cause the at least one processor to start media streaming over the 5G network, in response to, determining that the WebRTC session is eligible to request edge processing resources based on the service access information.

According to an embodiment, a non-transitory computer readable medium having instructions stored therein may be provided. The instructions, when executed by a processor of an apparatus for network driven management of 5G Real-time Media Communication (5G RTC) for edge processing, cause the processor to create a real-time communication (RTC) provisioning session among an edge enabled RTC application function (AF) and an edge enabled RTC application provider (AP); provision one or more RTC features associated with the RTC provisioning session; subsequent to a WebRTC session starting over a 5G network, determine service access information associated with the WebRTC session; and start media streaming over the 5G network, in response to, determining that the WebRTC session is eligible to request edge processing resources based on the service access information.

According to one or more embodiments, a method for network driven management of 5G Real-time Media Communication (5G RTC) for edge processing, the method being executed by at least one processor, the method may include creating a real-time communication (RTC) provisioning session by a RTC application provider (AP) with a RTC application function (AF); provisioning one or more RTC features associated with the RTC provisioning session by the RTC AP; receiving a notification of a WebRTC session starting over a 5G network; determining whether the WebRTC session is eligible for requesting edge resources; and starting media streaming over the 5G network.

According to an embodiment, an apparatus for network driven management of 5G Real-time Media Communication (5G RTC) for edge processing may be provided. The apparatus may include at least one memory configured to store program code; and at least one processor configured to read the program code and operate as instructed by the program code. The program code may include first creating code configured to cause the at least one processor to create a real-time communication (RTC) provisioning session by a RTC application provider (AP) with a RTC application function (AF); first provisioning code configured to cause the at least one processor to provision one or more RTC features associated with the RTC provisioning session by the RTC AP; first receiving code configured to cause the at least one processor to receive a notification of a WebRTC session starting over a 5G network; first determining code configured to cause the at least one processor to determine whether the WebRTC session is eligible for requesting edge resources; and streaming code configured to cause the at least one processor to start media streaming over the 5G network.

According to an embodiment, a non-transitory computer readable medium having instructions stored therein may be provided. The instructions, when executed by a processor of an apparatus for network driven management of 5G Real-time Media Communication (5G RTC) for edge processing, cause the processor to create a real-time communication (RTC) provisioning session by a RTC application provider (AP) with a RTC application function (AF); provision one or more RTC features associated with the RTC provisioning session by the RTC AP; receive a notification of a WebRTC session starting over a 5G network; determine whether the WebRTC session is eligible for requesting edge resources; and start media streaming over the 5G network.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
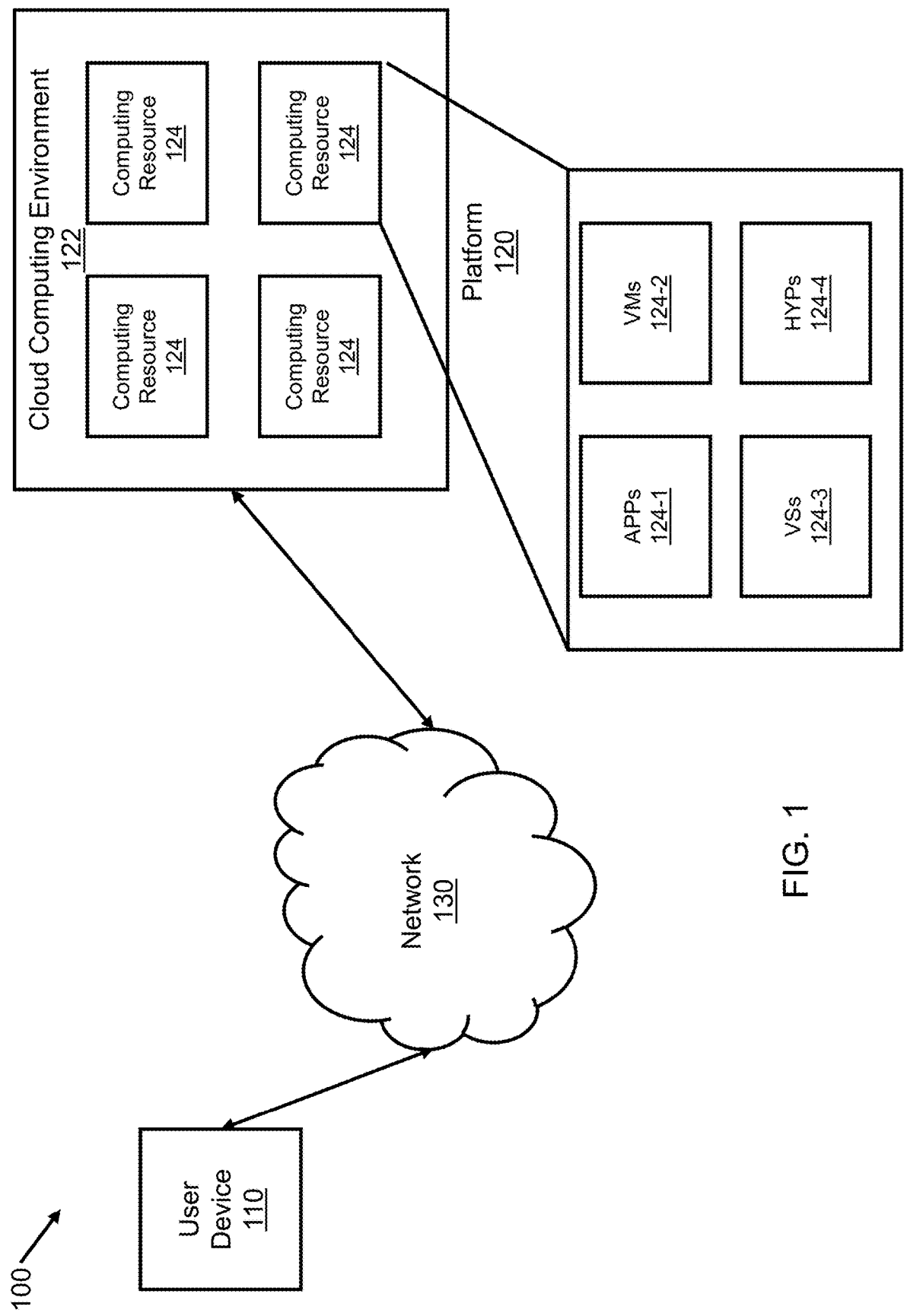
FIG. 1 is a diagram of an environment in which methods, apparatuses, and systems described herein may be implemented, according to embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications (APPs) 124-1, one or more virtual machines (VMs) 124-2, virtualized storage (VSs) 124-3, one or more hypervisors (HYPs) 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system (OS). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
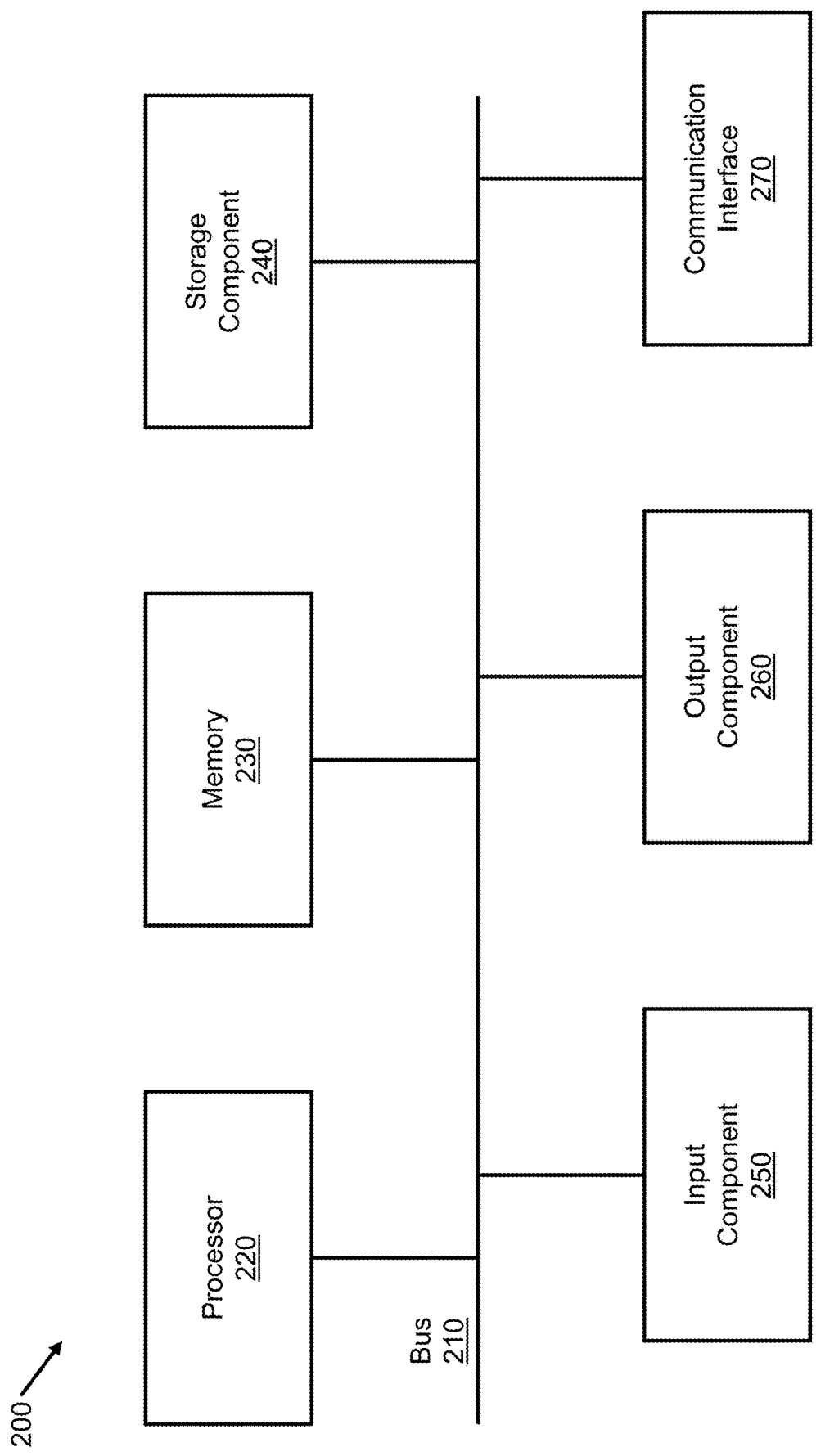
FIG. 2 is a block diagram of example components of one or more devices of FIG. 1, according to embodiments.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

A 5G media streaming (5GMS) system may be an assembly of application functions, application servers, and interfaces from the 5G media streaming architecture that support either downlink media streaming services or uplink media streaming services, or both. A 5GMS Application Provider may include a party that interacts with functions of the 5GMS system and supplies a 5GMS Aware Application that interacts with functions of the 5GMS system. The 5GMS Aware Application may refer to an application in the user equipment (UE), provided by the 5GMS Application Provider, that contains the service logic of the 5GMS application service, and interacts with other 5GMS Client and Network functions via the interfaces and application programming interfaces (APIs) defined in the 5GMS architecture. A 5GMS Client may refer to a UE function that is either a 5GMS downlink (5GMSd) Client or a 5GMS uplink (5GMSu) Client, or both.

The 5GMSd Client may refer to a UE function that includes at least a 5G media streaming player and a media session handler for downlink streaming and that may be accessed through well-defined interfaces/APIs. The 5GMSu Client may refer to an originator of a 5GMSu service that may be accessed through well-defined interfaces/APIs. A 5GMSu media streamer may refer to a UE function that enables uplink delivery of streaming media content to an Application Server (AS) function of the 5GMS Application Provider, and which interacts with both the 5GMSu Aware Application for media capture and subsequent streaming, and the Media Session Handler for media session control.

A dynamic policy may refer to a dynamic policy and charging control (PCC) rule for an uplink or downlink application flow during a media session. An egest session may refer to an uplink media streaming session from the 5GMS AS towards the 5GMSu Application Provider. An ingest session may refer to a session to upload the media content to a 5GMSd AS. A policy template may refer to a collection of (semi-static) Policy or Control Function (PCF)/Network Exposure Function (NEF) API parameters which are specific to the 5GMS Application Provider and also the resulting PCC rule. A policy template ID may identify the desired policy template, which is used by the 5GMSd Application Function (AF) to select the appropriate PCF/NEF API towards the 5G system so that the PCF can compile the desired PCC rule. The Media Player Entry may refer to a document or a pointer to a document that defines a media presentation (e.g., a media presentation description (MPD) for DASH or a uniform resource locator (URL) to a video clip file). A Media Streamer Entry may refer to a pointer (e.g., in the form of a URL) that defines an entry point of an uplink media streaming session. A presentation entry may refer to a document or a pointer to a document that defines an application presentation, such as an HTML5 document.

A Provisioning Session may refer to a data structure supplied at an interface (M1d) by a 5GMSd Application provider that configures the 5GMSd features relevant to a set of 5GMSd Aware Applications. A 5GMSd Media Player may refer to a UE function that enables playback and rendering of a media presentation based on a media play entry and exposing some basic controls such as play, pause, seek, stop, to the 5GMSd Aware Application. Server Access Information may refer to a set of parameters and addresses (including 5GMSd AF and 5GMSd AS addresses) which are needed to activate the reception of a streaming session. A Service and Content Discovery may refer to functionality and procedures provided by a 5GMSd Application Provider to a 5GMS Aware Application that enables the end user to discover the available streaming service and content offerings and select a specific service or content item for access. A Service Announcement may refer to procedures conducted between the 5GMS Aware Application and the 5GMS Application Provider such that the 5GMS Aware Application is able to obtain 5GMS Service Access Information, either directly or in the form of a reference to that information.

A third party player may refer to a part of an application that uses APIs to exercise selected 5GMSd functions to play back media content. A third party uplink streamer may refer to a part of an application that uses APIs to exercise selected 5GMSu functions to capture and stream media content.

Embodiments of the present disclosure are directed to procedures and methods that may be used for network driven edge processing and/or split rendering enabled edge processing for an RTC session. Specifically, an embodiment of the present disclosure is directed to use of network-driven edge provisioning as part the RTC provisioning. A same or another embodiment is directed to providing edge server information to the client. A same or another embodiment is directed to setting-up split rendering session on an edge server. A same or another embodiment of the present disclosure is directed to setting-up the RTC session accordingly.

A same or another embodiment of the present disclosure may be directed to a method or process for edge provisioning by network and/or split-rendering session set up by the client in the 5G real-time communication session. In embodiments, the edge server may be instantiated and configured by the Application Service Provider (or application provider) as part of provisioning. In embodiments the edge server information may be provided to the WebRTC application, so that the WebRTC application, if eligible, may request a WebRTC session or a split-rendering session on the allocated edge server. In embodiments, if the split-rendering server agrees, the session is established and the split-rendering process is run on the edge servers.

In embodiments, the edge provisioning by network may include the following operations. A person of skill in the art will know that the following steps may be executed in an order different than the examples provided herein.

In an embodiment, a new edge configuration server (ECS) is instantiated to manage new or increased demand for edge processing. Then, a new 5GMS application function (AF) that is edge-enabled is instantiated to handle new or increased demand for media sessions with edge processing. In embodiments, an edge enabler server (EES) may be configured for a specific or target edge data network (EDN). In embodiments, EES registers with the edge enabler client (ECS) that has authority over or is associated with the target EDN.

In embodiments, the RTC Application Provider (AP) or the RTC AF may create a new provisioning session, and may also create different configurations such as quality of service (QoS) support, charging, collection of consumption information, offering STUN/TURN servers, WebRTC signaling function, Edge Processing, etc.

In embodiments, subsequent to a user launching a WebRTC application, WebRTC Application may invoke the WebRTC framework with appropriate real-time streaming access parameters and the WebRTC application may inform the RTC media session handler (MSH) about the start of a new WebRTC session over 5G. Then, RTC MSH may retrieve Service Access Information from the RTC AF associated with or appropriate to the WebRTC session. Then, based on the Service Access Information, the RTC MSH determines whether the WebRTC session is eligible for requesting edge resources and or requesting split-rendering services.

When a WebRTC application and/or session is eligible for a split-rendering session on the edge server, the WebRTC application requests a split of the client media functions from the split-rendering client (SRC). The SRC then enquires the Media Session Handler about the client's media capabilities. The SRC and split rendering server (SRS) may then negotiate on the acceptable capabilities for the device and agree on the split option, and the SRC starts the split-rendering process. In embodiments, the SRS may acknowledge the SRC that the split-rendering on edge is running and provides its access. The SRC may also acknowledge the WebRTC application that the split-rendering on edge is running. Subsequent to the above, the media streaming of the RTC session starts and ends once the media streaming is complete.

In embodiments, a RTC application server (AS) may also be provisioned. This provisioning may require the RTC AF to check the provisioned edge processing resource template for the WebRTC application to determine the requirements of the WebRTC application. Based on these determined requirements, the RTC AF may request the instantiation of a new RTC AS EAS instance with the specified requirements and/or considering parameters provided in a query by the EEC. Then, a first or new instance of the EAS offering RTC AS capability with the requested placement and resources may be spawned. The newly instantiated RTC AS EAS instance may be configured and may register itself with the triggering EES. The RTC AS EAS may then be configured using the provisioned RTC features and a server-side application of the RTC AS EAS may be launched.

In embodiments, during media streaming using the RTC session, the WebRTC Application may connect to a selected RTC AS EAS and the real-time streaming may start. Supporting information about the WebRTC session may be passed from the WebRTC framework to the RTC MSH which may exchange supporting information about the WebRTC session with the RTC AF. Once the WebRTC Application informs the WebRTC framework that the RTC session has ended, the WebRTC framework may inform the RTC MSH about the end of the RTC session, and the RTC MSH may perform any final reporting to the RTC AF.

Figure 3:
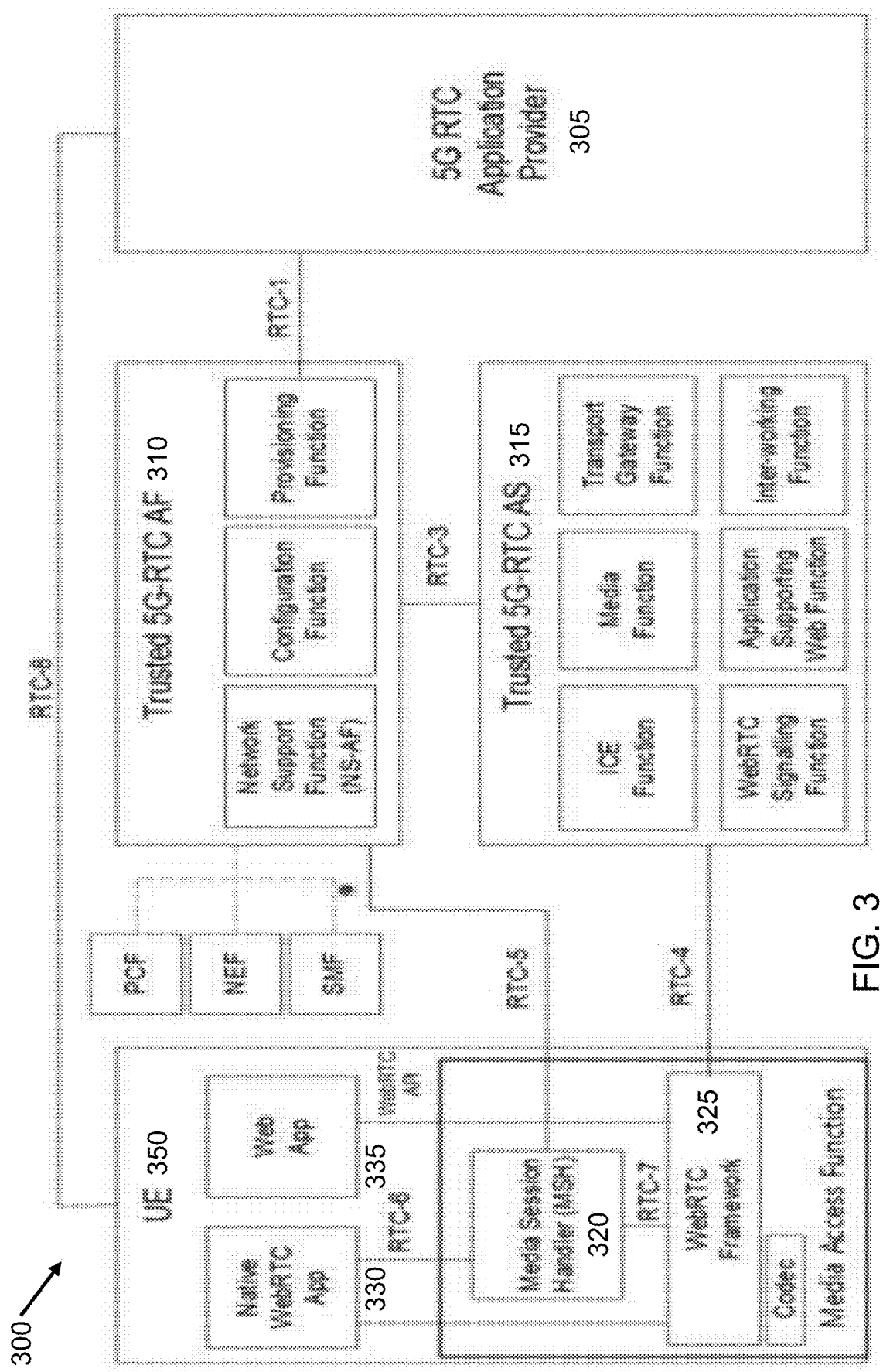
FIG. 3 is a diagram of a 5G real-time communication (RTC) architecture, according to embodiments.

FIG. 3 illustrates an exemplary 5G RTC architecture 300. The RTC architecture 300 may provide the core functions and entities to support WebRTC-based service over a 5G System.

The architecture 300 may include a 5G RTC Application Provider 305, a Trusted 5G RTC AF 310, a Trusted 5G RTC Application Server (AS) 315, and a UE 350.

The Application Provider 305 provides a RTC Aware-Application on the UE to make use of RTC endpoint and network functions using interfaces and APIs. The Trusted 5G RTC AF 310 may be dedicated to real-time media communication. The functions of the Trusted 5G RTC AF 310 may overlap with another Trusted 5G RTC AF. The Trusted 5G RTC AS 315 may be an application server dedicated to real-time media communication.

The UE 350 may include a Native WebRTC App 330, a Web App 335, a Media Session Handler 320, and a WebRTC Framework 325.

The 5G RTC Application Provider 305 may communicate with the Trusted 5G-RTC AF 310 through a RTC-1 interface. The RTC-1 interface allows the 5G RTC Application Provider 305 to provision support for RTC sessions that are offered by it. The provisioning may cover the following aspects: QoS support for WebRTC sessions; charging provisioning for WebRTC sessions; collection of consumption and QoE metrics data related to WebRTC sessions; offering ICE functionality such as STUN and TURN servers; offering WebRTC signaling function, potentially with interoperability to other signaling servers.

The Trusted 5G RTC AS 315 may exchange information regarding the RTC session with the Trusted 5G RTC AF 310 over a RTC-3 interface. This information may cover QoS flow information and QoS allocation as well as QoE and consumption reports. The 5G Trusted RTC AF 310 may subscribe to information about the status of the QoS flow, which it may share with the Trusted 5G RTC AS 315, e.g., in form of bitrate recommendations.

The Trusted 5G RTC AS 315 may communication with the WebRTC Framework 325 through a RTC-4 interface. This interface may be used to exchange the WebRTC traffic with the other endpoint as well as to exchange signaling information related to a WebRTC session with the trusted application servers. The traffic may include media streams sent over RTP, application data sent over data channel, WebRTC Signaling data along with STUN and TURN servers, and any other suitable application data.

The RTC-4 interface may further be grouped into two sub-interfaces RTC-4s and RTC-4m as follows. The RTC-4s interface is an interface between the WebRTC framework and the RTC AS such as WebRTC Signaling function. This interface is used for the exchange of signaling information related to the WebRTC session between two or more WebRTC endpoints using trusted application servers. In some cases where the signaling is not handled by WebRTC framework, the RTC-4s interface is an interface between the native WebRTC applications and the WebRTC Signaling server.

The RTC-4m interface is used for transmission of media and other related data between two or more RTC endpoints. The traffic includes media data transmitted over RTP, application data transmitted using Data channel, media related meta-data transmitted using Data channel.

The Trusted 5G RTC AF 310 may communication with the media session handler 320 through a RTC-5 interface. The RTC-5 interface is an interface between the media session handler 320 and the Trusted 5G RTC AF 310. This interface may be used to convey configuration information from the Trusted 5G RTC AF to the media session handler 320 and to request support for a starting/ongoing WebRTC session. The configuration information may include static information such as the following: recommendations for media configurations, configurations of STUN and TURN server locations, configuration about consumption and QoE reporting, discovery information for WebRTC signaling and data channel servers and their capabilities. The support functionality includes the following: receives the configuration information, media session handler 320 informs the Trusted 5G RTC AF 310 about a WebRTC session and its state, media session handler 320 requests QoS allocation for a starting or modified session, media session handler 320 receives notification about changes to the QoS allocation for the ongoing WebRTC session, media session handler 320 receives the updated information about the WebRTC session with the RTC STUN/TURN/Signaling function, e.g. to identify a WebRTC session and associate it with a QoS template.

The Native WebRTC App 330 communicates with the media session handler 320 through a RTC-6 interface. The media session handler 320 is a function in the UE 350 that provides access to RTC support functions to the native WebRTC applications. These functions may be offered on request, e.g., through the RTC-6 interface, or transparently without direct involvement of the application. The media session handler 320 may assist indirectly in the ICE negotiation by providing a list of STUN and TURN server candidates that offer RTC functionality. The media session handler 320 also collects QoE metric reports and submits consumption reports. It may also offer media configuration recommendations to the application through the RTC-6 interface.

The media session handler 320 may communicate with the WebRTC Framework 325 through a RTC-7 interface. The RTC-7 interface may be an interface between WebRTC framework and the native WebRTC Application to directly communicate media-specific information.

The 5G RTC Application Provider 305 communicated with the UE 350 through a RTC-8 interface. This interface may be used to exchange configuration information related to the RTC session or the application.

The embodiments of the present disclosure combine the edge server management developed in TS 26.501 and the split-rendering negotiation together to employ split-rendering on edge servers.

Figure 4A:
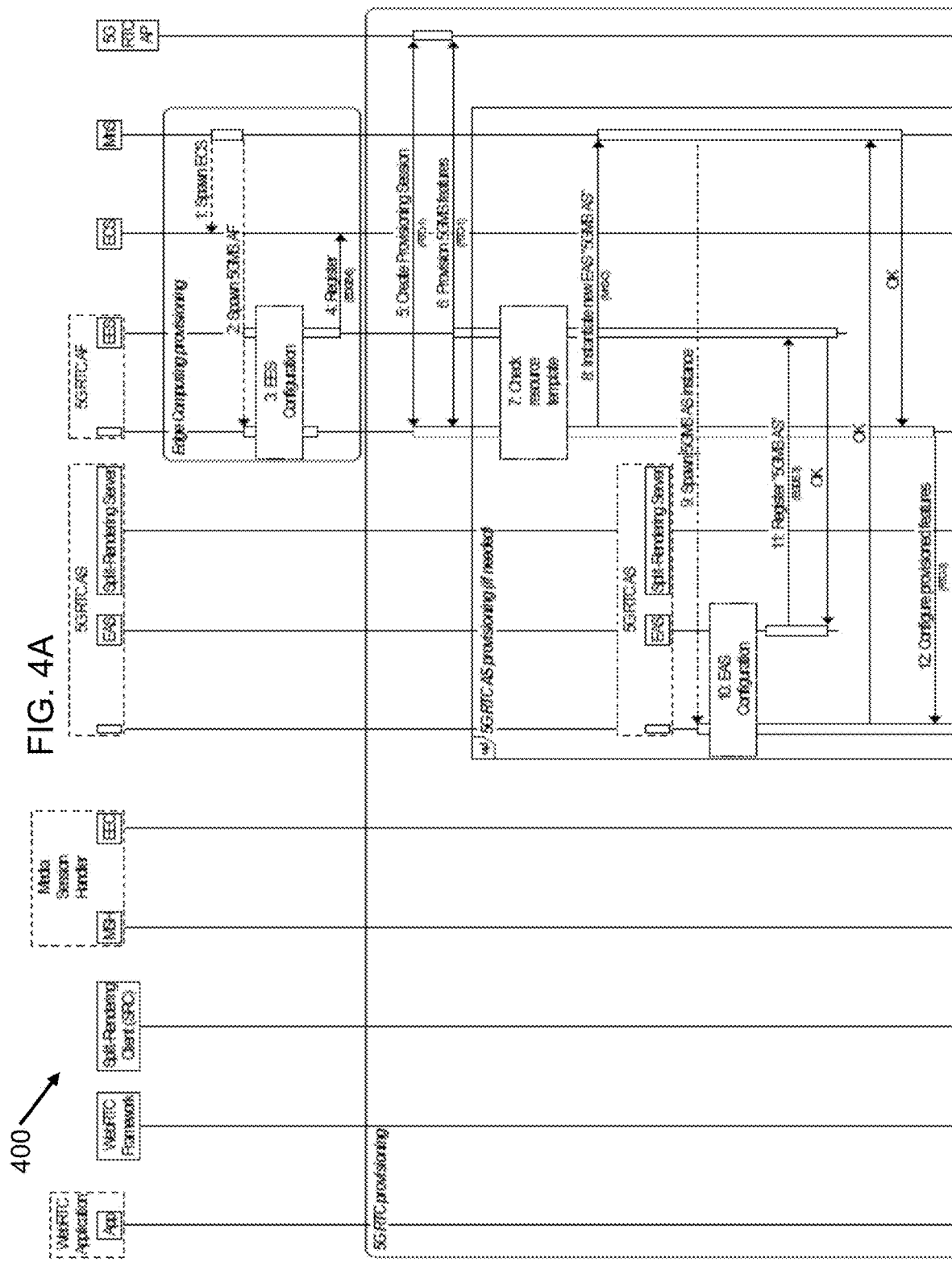
FIGS. 4A and 4B are diagrams of an exemplary operation flow of network driven management of 5G RTC edge processing, according to embodiments.
Figure 4B:
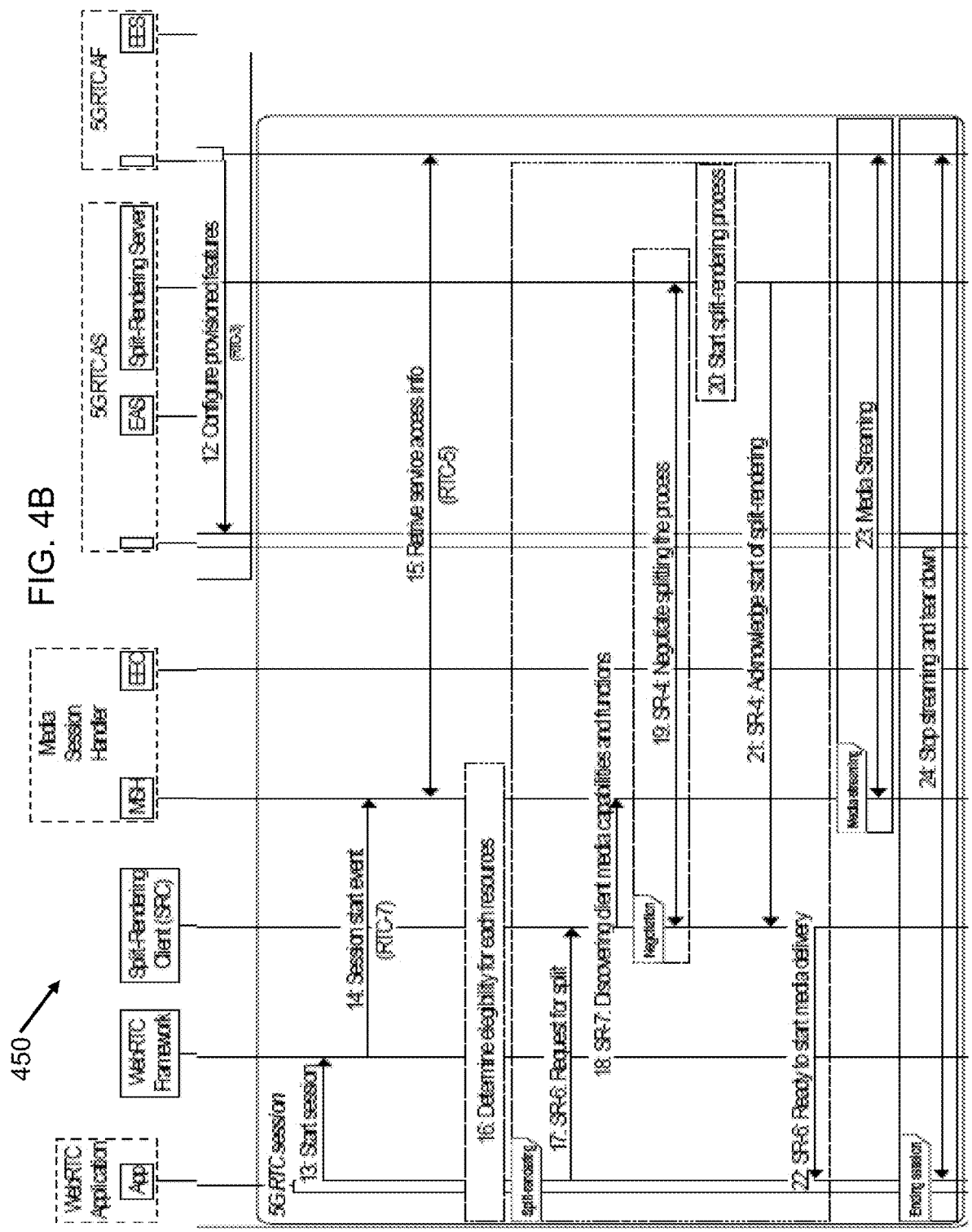

FIGS. 4A and 4B illustrates an example call flow 400 and 450 respectively for network driven management of 5G RTC edge processing, according to one or more embodiments. Call flow 450 is a continuation of call flow 400. The call flow 400 and 450 may be implemented using the architecture in FIG. 3. For example the UE in FIGS. 4A and 4B may be UE 350, the AS may be the Trusted 5G RTC AS 315, the Trusted 5G RTC AF 310, and the 5G RTC Application Provider 305.

As shown in call flow 400, a new ECS instance is instantiated to manage new or increased demand for edge processing in operation 1. At operation 2, a new RTC AF that is edge-enabled is instantiated to handle new or increased demand for WebRTC sessions with edge processing. The EES is configured for a specific Edge Data Network (EDN) at operation 3, and the EES registers with the ECS that is in authority over the target EDN at operation 4.

In embodiments, the RTC AP creates a new provisioning session at operation 5. In embodiments, RTC AF creates the new provisioning session. The RTC AP and/or RTC AF may create different configurations such as QoS support, charging, collection of consumption, offering STUN/TURN servers, WebRTC signaling function, Edge Processing, etc., in operation 6.

In embodiments, operation 7 may include The RTC AF checking the provisioned edge processing resource template for the related application to determine the requirements of the application. At operation 8, the RTC AF may request, for example, of the management services (MnS) to instantiate a new RTC AS EAS instance with the determined requirements and/or considering parameters provided in the query by the EEC. The MnS may then create a new instance of the EAS offering RTC AS capability with the requested placement and resources at operation 9. The newly instantiated RTC AS EAS instance may be configured at operation 10, and may register itself with the triggering EES at operation 11. Operation 12 may include configuring and launching the server-side application in the RTC AS.

As shown in call flow 450, at operation 13, the WebRTC Application may invoke the WebRTC framework with appropriate real-time streaming access parameters, and the WebRTC Application may inform the RTC MSH about the start of a new WebRTC session over 5G at operation 14. At operation 15, the RTC MSH may retrieve Service Access Information from the RTC AF appropriate to the WebRTC session. Using information from the Service Access Information, the RTC MSH and/or RTC AF may determine whether the WebRTC session is eligible for requesting edge resources at operation 16.

In embodiments where split rendering is performed, operations 17-22 may be performed. In an exemplary embodiment, operation 17 may include the WebRTC application requesting a split of the client media functions from the split-rendering client (SRC). At operation 18, the SRC may enquire the Media Session Handler about the client's media capabilities. At operation 19, SRC and split rendering server (SRS) may then negotiate on the acceptable capabilities for the device and agree on the split option, and the SRC starts the split-rendering process at operation 20. In embodiments, the SRS may acknowledge the SRC that the split-rendering on edge is running and provides its access at operation 21. The SRC may also acknowledge the WebRTC application that the split-rendering on edge is running at operation 22. Subsequent to the above, the media streaming of the RTC session starts and ends once the media streaming is complete.

Operations 23 and 24 may include media streaming and stopping media streaming respectively. Exemplary operations involved in media streaming and stopping are mentioned in further detail above.

Figure 5:
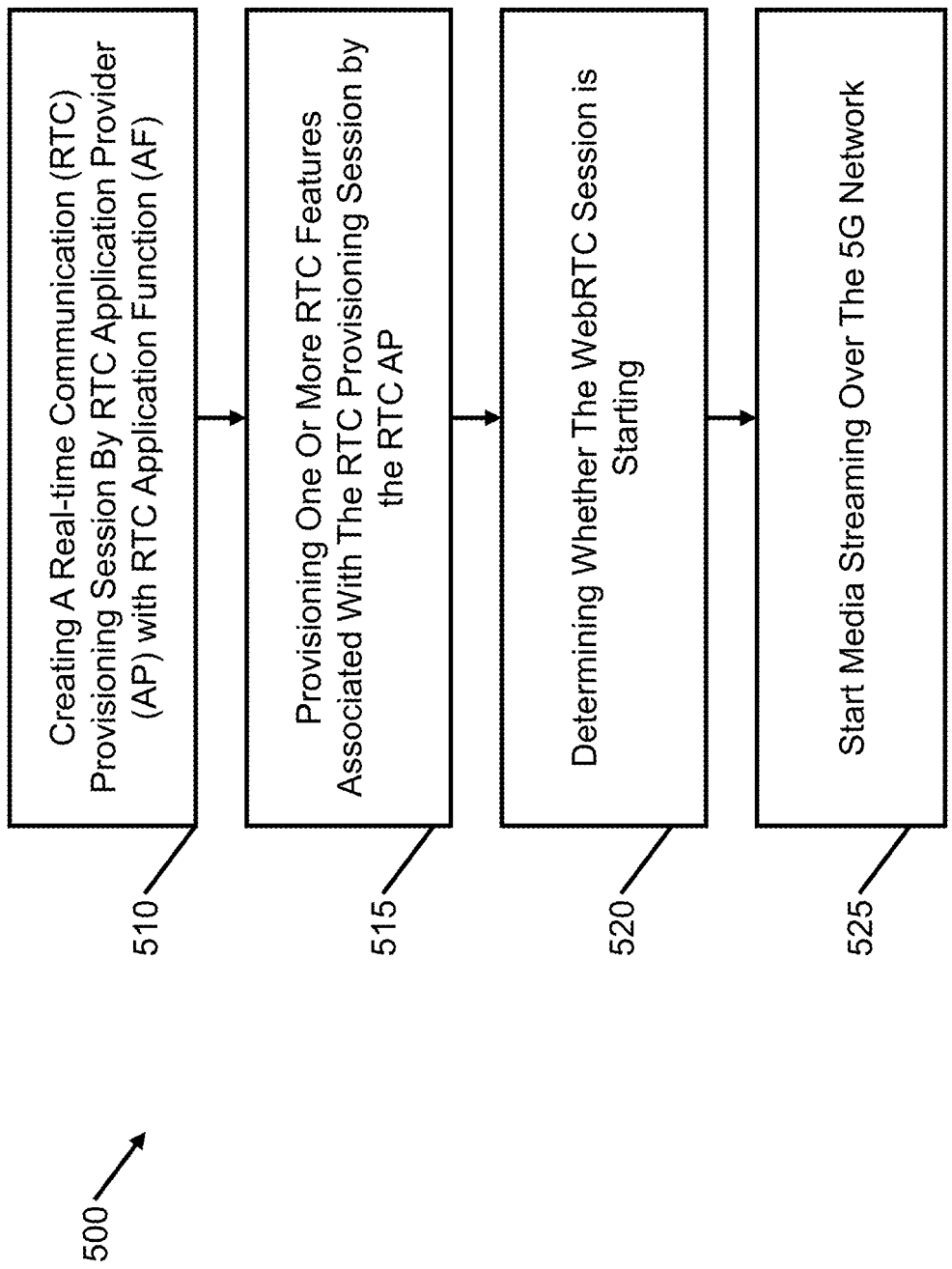
FIG. 5 is a flow chart of an example process for network driven management of 5G RTC edge processing, according to embodiments.

FIG. 5 illustrates a flow chart of a process 500 for network driven management of 5G Real-time Media Communication (5G RTC) for edge processing.

At operation 510, a real-time communication (RTC) provisioning session may be created with an edge enabled RTC application function (AF) by an edge enabled RTC application provider (AP).

At operation 515, one or more RTC features associated with the RTC provisioning session may be provisioned. In embodiments, the one or more RTC features comprise one or more of quality of service parameters, user device charging parameters, user device consumption information, information associated with one or more WebRTC session signaling servers, or edge processing parameters.

At operation 520, whether the WebRTC session is eligible for requesting edge resources may be determined. In some embodiments, the determination may include a notification of a WebRTC session starting over a 5G network.

At operation 525, media steaming may be started. In embodiments, a media session handler associated with a WebRTC application determines that the WebRTC session is eligible to request edge resources.

According to embodiments, process 500 may also include instantiating an edge enabled real-time-communication (RTC) application function (AF) in response to a demand for one or more WebRTC sessions with edge processing; configuring the edge enabled RTC AF for a target edge data network (EDN); and registering the edge enabled RTC AF with an edge configuration server (ECS) associated with the target EDN.

Process 500 may also include determining requirements of an associated WebRTC application using one or more provisional edge processing resource template; in response to determining the requirements of the associated WebRTC application, instantiating an edge enabled RTC application server (AS) having at least a capability equal to the requirements; and spawning the edge enabled RTC AS having at least the capability equal to the requirements.

What is claimed is:

1. A method for network driven management of 5G Real-time Media Communication (5G RTC) for edge processing, the method being executed by at least one processor, the method comprising:
creating a real-time communication (RTC) provisioning session by an RTC application provider (AP) with an RTC application function (AF);
provisioning one or more RTC features associated with the RTC provisioning session by the RTC AP;
receiving a notification of a WebRTC session starting over a 5G network;
determining whether the WebRTC session is eligible for requesting edge resources; and
starting media streaming over the 5G network.

2. The method of claim 1, wherein prior to creating the RTC provisioning session, the method comprises:
instantiating the RTC AF to manage a demand for one or more WebRTC sessions with edge processing;
configuring the RTC AF for a target edge data network (EDN); and
registering the RTC AF with an edge configuration server (ECS) associated with the target EDN.

3. The method of claim 1, wherein the one or more RTC features comprise one or more of quality of service parameters, user device charging parameters, user device consumption information, information associated with one or more WebRTC session signaling servers, or edge processing parameters.

4. The method of claim 1, wherein starting the media streaming over the 5G network:
connecting a WebRTC application associated with the WebRTC session with an RTC application server (AS);
passing supporting information about the WebRTC session from a WebRTC framework to an RTC media session handler; and
reporting the supporting information by the RTC media session handler to the RTC AF.

5. The method of claim 4, wherein the method further comprises:
reporting an ending of the WebRTC session to the WebRTC framework by the WebRTC application;
reporting the ending of the WebRTC session to the RTC media session handler by the WebRTC framework; and
performing a final reporting to the RTC AF by the RTC media session handler.

6. The method of claim 1, wherein receiving the notification of the WebRTC session starting comprises:
invoking a WebRTC framework using a WebRTC application associated with the WebRTC session and using one or more of the one or more RTC features;
informing an RTC media session handler about a start of the WebRTC session;
retrieving service access information about the WebRTC session from the RTC AF by the RTC media session handler; and
reporting the start of the WebRTC session to the RTC media session handler.

7. The method of claim 1, wherein the method further comprises:
determining requirements of a WebRTC application associated with the WebRTC session by the RTC AF using one or more provisional edge processing resource template;
instantiating an RTC application server (AS) having at least a capability equal to the requirements; and
spawning the RTC AS having at least the capability equal to the requirements.

8. The method of claim 7, wherein the RTC AF determines the requirements of the WebRTC application and the spawning of the RTC AS.

9. The method of claim 7, wherein the method further comprises:
configuring the RTC AS;
registering the RTC AS with the RTC AF; and
launching a server-side application in the RTC AS.

10. An apparatus for network driven management of 5G Real-time Media Communication (5G RTC) for edge processing, the apparatus comprising:
at least one memory configured to store program code; and
at least one processor configured to read the program code and operate as instructed by the program code, the program code including:
first creating code configured to cause the at least one processor to create a real-time communication (RTC) provisioning session by an RTC application provider (AP) with an RTC application function (AF);

first provisioning code configured to cause the at least one processor to provision one or more RTC features associated with the RTC provisioning session by the RTC AP;

first receiving code configured to cause the at least one processor to receive a notification of a WebRTC session starting over a 5G network;

first determining code configured to cause the at least one processor to determine whether the WebRTC session is eligible for requesting edge resources; and streaming code configured to cause the at least one processor to start media streaming over the 5G network.

11. The apparatus of claim 10, wherein prior to the first creating code, the program code further comprises:

first instantiating code configured to cause the at least one processor to instantiate the RTC AF to manage a demand for one or more WebRTC sessions with edge processing;

first configuring code configured to cause the at least one processor to configure the RTC AF for a target edge data network (EDN); and first registering code configured to cause the at least one processor to register the RTC AF with an edge configuration server (ECS) associated with the target EDN.

12. The apparatus of claim 10, wherein the one or more RTC features comprise one or more of quality of service parameters, user device charging parameters, user device consumption information, information associated with one or more WebRTC session signaling servers, or edge processing parameters.

13. The apparatus of claim 10, wherein the streaming code comprises:

first connecting code configured to cause the at least one processor to connect a WebRTC application associated with the WebRTC session with an RTC application server (AS);

first passing code configured to cause the at least one processor to pass supporting information about the WebRTC session from a WebRTC framework to an RTC media session handler; and first reporting code configured to cause the at least one processor to report the supporting information by the RTC media session handler to the RTC AF.

14. The apparatus of claim 13, wherein the streaming code further comprises:

second reporting code configured to cause the at least one processor to report an ending of the WebRTC session to the WebRTC framework by the WebRTC application;

third reporting code configured to cause the at least one processor to report the ending of the WebRTC session to the RTC media session handler by the WebRTC framework; and first performing code configured to cause the at least one processor to perform a final reporting to the RTC AF by the RTC media session handler.

15. The apparatus of claim 10, wherein the first receiving code comprises:

first invoking code configured to cause the at least one processor to invoke a WebRTC framework using a WebRTC application associated with the WebRTC session and using one or more of the one or more RTC features;

first informing code configured to cause the at least one processor to inform an RTC media session handler about a start of the WebRTC session;

first retrieving code configured to cause the at least one processor to retrieve service access information about the WebRTC session from the RTC AF by the RTC media session handler; and first indicating code configured to cause the at least one processor to report the start of the WebRTC session to the RTC media session handler.

16. The apparatus of claim 10, wherein the program code further comprises:

second determining code configured to cause the at least one processor to determine requirements of a WebRTC application associated with the WebRTC session by the RTC AF using one or more provisional edge processing resource template;

second instantiating code configured to cause the at least one processor to instantiating an RTC application server (AS) having at least a capability equal to the requirements; and first spawning code configured to cause the at least one processor to spawn the RTC AS having at least the capability equal to the requirements.

17. The apparatus of claim 16, wherein the RTC AF determines the requirements of the WebRTC application and the spawning of the RTC AS.

18. The apparatus of claim 16, wherein the program code further comprises:

second configuring code configured to cause the at least one processor to configure the RTC AS;

second registering code configured to cause the at least one processor to register the RTC AS with the RTC AF; and first launching code configured to cause the at least one processor to launch a server-side application in the RTC AS.

19. A non-transitory computer readable medium having instructions stored therein, which when executed by a processor of an apparatus for network driven management of 5G Real-time Media Communication (5G RTC) for edge processing, cause the processor to:

create a real-time communication (RTC) provisioning session by an RTC application provider (AP) with an RTC application function (AF);

provision one or more RTC features associated with the RTC provisioning session by the RTC AP;

receive a notification of a WebRTC session starting over a 5G network;

determine whether the WebRTC session is eligible for requesting edge resources; and start media streaming over the 5G network.

20. The non-transitory computer readable medium of claim 19, wherein receiving the notification of the WebRTC session starting comprises:

invoking a WebRTC framework using a WebRTC application associated with the WebRTC session and using one or more of the one or more RTC features;

informing an RTC media session handler about a start of the WebRTC session;

retrieving service access information about the WebRTC session from the RTC AF by the RTC media session handler; and reporting the start of the WebRTC session to the RTC media session handler.

* * * * *